(12) United States Patent
Ide

(10) Patent No.: US 7,291,573 B2
(45) Date of Patent: Nov. 6, 2007

(54) LOW MELTING GLASS, SEALING COMPOSITION AND SEALING PASTE

(75) Inventor: Asahi Ide, Funabashi (JP)

(73) Assignee: Asahi Techno Glass Corporation, Funabashi-shi (JP)

(*) Notice: Subject to any disclaimer, the term of this patent is extended or adjusted under 35 U.S.C. 154(b) by 177 days.

(21) Appl. No.: 11/262,746

(22) Filed: Nov. 1, 2005

(65) Prior Publication Data

US 2006/0105898 A1 May 18, 2006

(30) Foreign Application Priority Data

Nov. 12, 2004 (JP) .............................. 2004-328729
Jun. 23, 2005 (JP) .............................. 2005-183616
Sep. 29, 2005 (JP) .............................. 2005-283566

(51) Int. Cl.
*C03C 8/24* (2006.01)
*C03C 3/145* (2006.01)

(52) U.S. Cl. .............................. 501/50; 501/11; 501/14; 501/15; 501/17; 501/18; 501/20; 501/26; 501/52

(58) Field of Classification Search .................. 501/11, 501/14, 15, 17, 18, 20, 26, 50, 52
See application file for complete search history.

(56) References Cited

U.S. PATENT DOCUMENTS 5,256,604 A * 10/1993 Aitken .......................... 501/45
5,306,674 A * 4/1994 Ruderer et al. ............... 501/20
5,346,863 A * 9/1994 Hikata et al. .................. 501/17
5,643,840 A * 7/1997 Hikata et al. .................. 501/18
5,733,828 A 3/1998 Usui et al.
6,355,586 B1 * 3/2002 Usui et al. ..................... 501/45
6,376,400 B1 * 4/2002 Fujimine et al. .............. 501/49
6,497,962 B1 * 12/2002 Fujimine et al. ............ 428/426
6,936,556 B2 * 8/2005 Sridharan et al. ............. 501/14
2003/0228471 A1* 12/2003 Hayakawa et al. ......... 428/426
2005/0181927 A1* 8/2005 Hasegawa et al. ............ 501/79
2005/0231118 A1* 10/2005 Fujimine et al. ............ 313/586

FOREIGN PATENT DOCUMENTS

JP          9-278483        10/1997
JP          10-139478       5/1998
JP          2001139345 A *  5/2001

OTHER PUBLICATIONS

"Measuring methods for the specific surface area of fine ceramic powders by gas adsorption using the BET method", Japanese Industrial Standard R 1626, 1996, 20 pages, no month.

* cited by examiner

*Primary Examiner*—Anthony J. Green
(74) *Attorney, Agent, or Firm*—Oblon, Spivak, McClelland, Maier & Neustadt, P.C.

(57) ABSTRACT

A low melting glass, which contains substantially no lead and contains 70-90% of $Bi_2O_3$, 1-20% of ZnO, 2-12% of $B_2O_3$, 0.1-5% of $Al_2O_3$, 0.1-5% of $CeO_2$, 0-5% of CuO, 0-0.2% of $Fe_2O_3$ and 0.05-5% of $CuO+Fe_2O_3$ in mass %, wherein a content of alkali metal oxides in the glass composition is less than 0.1%, and the glass does not crystallize by pre-baking at a sealing temperature or more, can be used for sealing later, and can suppress deterioration of a material such as platinum or platinum-rhodium to provide a stable melting operation for a long period.

18 Claims, No Drawings

LOW MELTING GLASS, SEALING COMPOSITION AND SEALING PASTE

CROSS-REFERENCE TO RELATED APPLICATIONS

This application is based upon and claims the benefits of priority from the prior Japanese Patent Applications No. 2004-328729 filed on Nov. 12, 2004, No. 2005-183616 filed on Jun. 23, 2005, and No. 2005-283566 filed on Sep. 29, 2005; the entire contents of which are incorporated herein by reference.

BACKGROUND

1. Field of the Invention

The present invention relates to a low melting glass, a sealing composition and a sealing paste, and more particularly to those which contain substantially no lead component and are used for manufacturing of a flat panel display such as a plasma display panel (hereinafter referred to as the PDP).

2. Description of the Related Art

Conventionally, a sealing composition used to seal the periphery of the PDP was generally a lead-based material consisting of lead-based glass powder of $PbO$—$SiO_2$—$B_2O_3$ or the like and a filler such as refractory ceramics powder. But, in these years, it is demanded to develop a composition, which does not contain a hazardous component such as a lead component for environmental reasons and can seal at a low temperature.

As a low melting glass not containing a lead component and the like, there are known phosphate glass, borosilicate glass, alkali silicate glass and bismuth glass, among which the bismuth glass attracts attention because it can be baked at a low temperature and is excellent in chemical endurance.

The bismuth glass which has been developed by now has a coefficient of thermal expansion of 90 to $110 \times 10^{-7}$/° C. which is different from a coefficient of thermal expansion (70 to $80 \times 10^{-7}$/° C.) of glass which is used for sealing of a display and its accessories (such as a flat backlight). In order to match them, the bismuth glass is blended with a low-expansion refractory ceramics filler.

But, if an amount of ZnO contained in the low melting glass composition using the bismuth glass is little, a coefficient of thermal expansion becomes $110 \times 10^{-7}$/° C. or more. Meanwhile, if a large amount of refractory ceramics filler is blended in order to reduce the coefficient of thermal expansion, the material has an increased viscosity, and sealing is disabled at less than 500° C. (see Japanese Patent Laid-Open Application No. Hei 9-278483). Conversely, a low melting glass containing a large amount of ZnO is also developed but has a disadvantage that its chemical endurance is degraded because it contains a large amount of $Bi_2O_3$ but does not contain $Al_2O_3$ (see Japanese Patent Laid-Open Application No. Hei 10-139478).

Meanwhile, when the PDP is produced, a sealing material which has a sealing composition in a paste form is baked at a sealing temperature of 500° C. or less (preferably 480° C. or less) in order to suppress excessive flow of a sealing portion, generation of foams and also a thermal damage to other members such as ribs, phosphors, electrodes. But, because these members are also produced by the same baking treatment as the sealing of the sealing material, there were problems that the process became long when they were baked separately and the manufacturing cost became high.

To remedy the problems, it has come to shorten the process by baking the plural members at the same time in these years, and the sealing material is also degraded and pre-baked simultaneously in combination with the other members. In other words, the sealing temperature of the other members and the pre-baking temperature of the sealing material have become the same. Therefore, the baking temperature of the sealing material is required to be lower than the baking temperature of the other members such as ribs, phosphors, electrodes and the like. As a result, as the sealing material, there is a demand for a low melting glass of which fluidity is not impaired even if it is heated to a pre-baking temperature higher than the sealing temperature and can make sealing.

A conventional lead-based glass had a wide sealable temperature range (in which the low melting glass can seal without crystallizing when it is used as amorphous glass), satisfying the above-described demanded characteristics. But, the bismuth glass could seal at a low temperature but had a narrow sealable temperature range. Therefore, if the pre-baking temperature exceeds the sealable temperature range, there are problems that the bismuth glass becomes more likely to generate crystal because of $Bi_2O_3$ as well as $B_2O_3$ and ZnO contained in its glass components, and sealing cannot be made at the sealing temperature when baking.

The bismuth glass has superior fluidity at 500° C. or more to other low melting glasses. Therefore, when it is pre-baked at 500° C. or more, the sealed portion of the sealing material flows excessively, and a recess is produced at the center. This recess forms a cavity and remains as a remaining foam after sealing, and the adhered surface is deformed, causing a problem that air tightness cannot be maintained by the sealing material.

Besides, for mass production, it is desirable to perform melting by a continuous melting furnace which continuously performs a series of steps from supplying of materials to forming. To obtain homogeneous glass in the same way as the lead-based glass, it is generally necessary to heat the bismuth glass to 1000° C. or more for melting. But, when refractory bricks are used as the furnace material, elutes (e.g., alkali metal oxide, zirconia, etc.) from the surfaces of bricks increase because the bismuth glass is highly erosive. And, the elutes make a crystal nucleus of glass to cause a problem that the glass is crystallized when pre-baking. Because this bismuth glass has very low viscosity when melting and small surface tension, there are problems that the glass might leak through joints of the bricks which were enlarged by erosion when operating, and the glass cannot be melted stably for a long period of time.

As described above, as the manufacturing process is shortened, the sealing material is heated to a temperature exceeding the sealing temperature in the pre-baking step. Even after the same pre-baking, the conventional lead-based material could seal by baking at a temperature lower than the pre-baking temperature.

But, the bismuth glass developed heretofore could not seal at a temperature lower than the pre-baking temperature in the manufacturing of particularly a flat panel display such as the PDP. Even if sealing could be made, the glass which could seal finely was not found because sealing strength was low or foams remaining after sealing increased.

The melting furnace having platinum or an alloy of platinum-rhodium coated on its surface was not satisfactory as a continuous melting furnace capable of mass-producing stably for a long period because platinum or the like was heavily deteriorated (erosion or cracks) when the bismuth glass is used.

Accordingly, the present invention has been made to remedy the problems of the above-described conventional sealing composition, and provides a low melting glass formed of bismuth glass, which is not crystallized even if pre-baked at a sealing temperature or more, can seal at a pre-baking temperature or less and can be melted stably for a long period while suppressing platinum, platinum-rhodium or the like from deteriorating, a sealing composition using the above glass and a sealing paste. Simple indication "%", in the specification means "mass %".

BRIEF SUMMARY OF THE INVENTION

The present inventors have made devoted studies to remedy the above-described problems and found that a composition containing a powder of low melting glass which contains glass components indicated below and a refractory ceramics filler remedies the above-described problems, and achieved the present invention.

Specifically, a low melting glass of the present invention contains substantially no lead and contains 70-90% of $Bi_2O_3$, 1-20% of ZnO, 2-12% of $B_2O_3$, 0.1-5% of $Al_2O_3$, 0.1-5% of $CeO_2$, 0-5% of CuO, 0-0.2% of $Fe_2O_3$ and 0.05-5% of $CuO+Fe_2O_3$ in mass %, wherein a total amount of alkali metal oxides is less than 0.1%.

A low melting glass of the present invention contains substantially no components of lead, thallium, cadmium and vanadium (hereinafter referred to as the lead component and the like), and contains 70-90% of $Bi_2O_3$, 5-15% of ZnO, 2-8% of $B_2O_3$, 0.1-5% of $Al_2O_3$, 0.01-2% of $SiO_2$, 0.1-5% of $CeO_2$, 0.01-4.99% of CuO, 0.01-0.2% of $Fe_2O_3$ and 0.05-5% of $CuO+Fe_2O_3$ in mass %, wherein a total amount of alkali metal oxides and alkaline-earth metal oxides is less than 0.1%.

The composition of the low melting glass of the present invention satisfies a relation of $Al_2O_3/Bi_2O_3$=0.01-0.1 and $(CuO+Fe_2O_3)/Bi_2O_3$=0.01-0.05 in a molar ratio.

The low melting glass of the present invention is not crystallized even when pre-baked and can seal at the pre-baking temperature or less.

A sealing composition according to the present invention comprises 60-99 volume % of powder of the low melting glass according to the present invention, and 1-40 volume % of powder of at least one type of refractory ceramics filler selected from the group consisting of zircon, cordierite, aluminium titanate, alumina, mullite, silica (rock crystal, α-quartz, quartz glass, cristobalite, tridymite or the like), tin oxide ceramics, β-eucryptite, β-spodumene, zirconium phosphate ceramics and β-quartz solid solution.

The sealing paste of the present invention is obtained by mixing a vehicle with the sealing composition of the present invention.

The low melting glass of the present invention is made of a bismuth glass composition and does not contain a lead component. Therefore, it is free from a possibility of causing environmental problems because of lead component. And, this low melting glass has a wide sealable temperature range and does not crystallize even if pre-baked at 450-550° C. Therefore, it can perform sealing after that. Accordingly, the low melting glass of the present invention can be used for simultaneous baking with plural members conducted in the mass-production of the PDP.

The low melting glass of the present invention is determined to contain less than 0.1% of a total of the contents of alkali metal oxide and alkaline-earth metal oxide components, and has $SiO_2$ as an essential component. Thus, erosion to the refractories when melting can be suppressed effectively, so that deterioration is substantially not observed even when melted in a refractory of platinum or platinum-rhodium, and a stable operation can be performed in the mass production.

And, because mixing of alkali metal oxides and alkaline-earth metal oxides is suppressed, defective color development of a phosphor after sealing, a change in dielectric constant of a dielectric substance and a decrease in electrical conductivity of electrodes are not caused.

DETAILED DESCRIPTION OF THE INVENTION

Individual components of the low melting glass of the present invention will be described below, and a sealing composition and a sealing paste will also be described.

$Bi_2O_3$ is an oxide which forms a mesh structure of the glass of the present invention and is desirably contained in a range of 70-90% within the glass composition. If $Bi_2O_3$ is less than 70%, the softening point of the low melting glass becomes high, and it cannot be used as a sealing composition capable of sealing at a low temperature. If $Bi_2O_3$ exceeds 90%, it does not vitrify, and a coefficient of thermal expansion becomes excessively high.

The content of $Bi_2O_3$ in the glass composition is more preferably 75-85 wt % in view of a softening point under load, a coefficient of thermal expansion and the like. Here, the softening point under load is a temperature indicated by a second inflection point of a heat balance curve which is obtained by raising a temperature of a sample powder of the above-described glass at a speed of 10° C./minute by a differential thermal analyzer (DTA).

ZnO is a component which lowers a coefficient of thermal expansion and a softening point under load, and is desirably contained in a range of 1-20% within the glass composition. If ZnO is less than 1%, vitrification is difficult, and if it exceeds 20%, stability when forming the low melting glass becomes poor, and devitrification tends to occur. Therefore, there is a possibility that the glass cannot be obtained. The content of ZnO in the glass composition is more preferably 5-15%, and most preferably 7-12% in view of the stability and the like of the glass.

$Al_2O_3$ is a component which lowers the coefficient of thermal expansion of the glass, improves the stability of the low melting glass when pre-baking, and is desirably contained in a range of 0.1-5% within the glass composition. If $Al_2O_3$ is less than 0.1%, crystal nucleus or crystal is deposited within the low melting glass when pre-baking at 500° C. or more, and sealing cannot be made at a temperature lower than the pre-baking temperature. And, if it exceeds 5%, the viscosity of the glass increases, and there is a possibility that $Al_2O_3$ remains as an unmelted substance within the low melting glass. The content of $Al_2O_3$ in the glass composition is more preferably 0.5-2% in view of a coefficient of thermal expansion, stability of glass, a melting property and the like.

A molar ratio of $Al_2O_3/Bi_2O_3$=0.01-0.1 is desirable to avoid the generation of crystal even if the sealable temperature range of the low melting glass is expanded to perform pre-baking at a sealing-scheduled temperature or more. If the molar ratio is less than 0.01, crystal nucleus or crystal is deposited in the low melting glass when pre-baking, and sealing cannot be made at a temperature lower than the pre-baking temperature. And, if the molar ratio exceeds 0.1, the viscosity of the glass increases, and $Al_2O_3$ is not melted completely even if the glass is melted at 1200° C. If $Al_2O_3/Bi_2O_3$ is in the above range, the glass is not crystallized even if pre-baked at a sealing-scheduled temperature or more, and a stable mesh structure of the glass can be formed.

$B_2O_3$ is a component which expands the range in which the skeleton of the glass is formed to make vitrification possible and is desirably contained in 2-12% within the glass composition. If $B_2O_3$ is less than 2%, the vitrification becomes difficult, and if it exceeds 12%, the softening point becomes excessively high, and it becomes hard to seal at a low temperature even if a load is applied when-sealing. The content of $B_2O_3$ in the glass composition is more preferably 2-8%, and most preferably 3-7% in view of a coefficient of thermal expansion, stability of glass, softening point under load and the like.

Besides, to obtain a low melting glass stably, a relation of $B_2O_3$ to ZnO is desired to meet a relation of $B_2O_3/ZnO=0.4-1.0$ in molar ratio. If the molar ratio is less than 0.4 or exceeds 1.0, devitrification occurs in the glass after melting, and vitrification becomes difficult. It is more preferable that the relation of $B_2O_3/ZnO=0.5-0.9$ is satisfied.

$Fe_2O_3$ is a component which has an effect of expanding the sealable temperature range of glass by suppressing crystallization when sealing without increasing the viscosity substantially. But, if it is added excessively, the vitrification range becomes small, so that its content in the glass composition is preferably 0-0.2% and more preferably 0.01-0.2%.

CuO is a component which lowers the viscosity of the glass and especially expands the sealable temperature range of the glass on the low temperature side, and its content in the glass composition is 0-5%, preferably 0.01-4.99%, more preferably 0.1-3%, furthermore preferably 0.1-1.5%, and most preferably 0.1-1.49%. If the content of CuO exceeds 5%, the crystal deposition speed becomes high, and the sealable temperature range of the glass on the high temperature side becomes narrow, and the phosphor may be deteriorated when it is used for electronic parts. Therefore, it is desirable to avoid its excessive addition.

CuO and $Fe_2O_3$ are essential components to enhance the fluidity of the glass at 480° C. or less and to stabilize the glass when pre-baking, and their total content in the glass composition is preferably 0.05-5%. If their total content in the glass composition is less than 0.05%, the above effects cannot be obtained, and if the content is higher than 5%, the glass becomes instable, its sealable temperature range on the high temperature side becomes narrow and tends to crystallize. The total content is more preferably in a range of 0.1-2%.

Besides, to satisfy both of the suppression of crystallization when pre-baking at the sealing-scheduled temperature or more and the sealable viscosity at a pre-baking temperature or below by expanding the sealable temperature range of the glass, it is preferable that the relation of $Fe_2O_3$ and CuO to $Bi_2O_3$ satisfies a relation of $(CuO+Fe_2O_3)/Bi_2O_3=0.01-0.05$ in molar ratio. If the molar ratio is less than 0.01, the fluidity of the glass enough for sealing at a low temperature cannot be obtained even if a load is applied, and if the molar ratio exceeds 0.05, the sealable temperature range of the glass becomes narrow, and the glass crystallizes at the sealing-scheduled temperature or more. Therefore, the target low melting glass of the present invention cannot be obtained. Cu and Fe are elements which tend to occur a change in valency, and their addition in the above range lowers the viscosity of the glass, and they have effects of suppressing a change in Bi valency and not crystallizing the glass by their valency change when heating.

$CeO_2$ has effects that $Bi_2O_3$ in the glass component is suppressed from depositing as metal bismuth when the glass is melting and the glass fluidity is stabilized, and its content in the glass composition is 0.1-5%. If its content is less than 0.1%, the above effects cannot be obtained, and if it is 5% or more, the viscosity of the glass increases, and the target sealing at 480° C. or less becomes difficult. Its content is preferably 0.1-3%, and more preferably 0.1-1.5%.

To contain $SiO_2$, it is preferable that the low melting glass of the present invention has a composition which contains substantially no lead component and the like and contains 70-90% of $Bi_2O_3$, 5-15% of ZnO, 2-8% of $B_2O_3$, 0.1-5% of $Al_2O_3$, 0.01-2% of $SiO_2$, 0.1-5% of $CeO_2$, 0.01-4.99% of CuO, 0.01-0.2% of $Fe_2O_3$ and 0.05-5% of $CuO+Fe_2O_3$ in mass %, and has a total amount of less than 0.1% of alkali metal oxides and alkaline-earth metal oxides.

It was found as a result of the studies made by the present inventors that $SiO_2$ is a component which suppresses excessive flowing of the sealing composition when pre-baking and is effective to decrease remaining foams after sealing and also suppresses the erosion to the refractories when melting the glass. And, it has an effect to lower a coefficient of thermal expansion of the glass and to improve the stability of the low melting glass when pre-baking, and it is preferably contained in a range of 0.01-2% within the glass composition. If $SiO_2$ is less than 0.01%, excessive flowing cannot be suppressed when pre-baking at 500° C. or more, and the refractories are easily eroded when melting. If it exceeds 2%, the glass viscosity increases, sealing at 500° C. or less becomes difficult, and the melting temperature of the glass rises, and deterioration of the refractories is accelerated. In view of the coefficient of thermal expansion, stability, melting property and the like of the glass, its content is more desirably 0.1-1.5%.

The present inventors have found that when bismuth glass is melted in a crucible which is made of platinum or an alloy mainly consisting of platinum, platinum is acceleratedly deteriorated (erosion and crack) if the glass component contains alkali metals such as Li, Na, K and the like. To suppress the drawback, a total of the alkali metal oxides in the glass materials is desirably set to less than 0.1%, and more preferably 0.01% or less.

And, if the alkali metal oxide such as $Li_2O$, $Na_2O$, $K_2O$ and the like are contained in 0.1% or more, crystallization occurs at a pre-baking temperature of 480° C. or more, and sealing cannot be made. Besides, when the inside of the display elements of a flat panel display such as the PDP is heated and decompressed, alkali metal elements are diffused within the display elements. Thus, interference with a mixed gas sealed in order to generate ultraviolet rays occurs, resulting in a possibility that the generated amount of ultraviolet rays is decreased, some of the above-described elements move to the electrode material or the dielectric substance which is in contact with the sealing composition when pre-baking to change dielectric constant or degrade electrical conductivity. Besides, when bismuth glass is melted in a crucible which is made of platinum or an alloy mainly consisting of platinum, degradation (erosion and crack) of these refractories is accelerated. To remedy the above problems, the alkali metal oxides in the glass material must be controlled to a total of less than 0.1% in the glass composition, and desirably to 0.01% or less.

Besides, alkaline-earth metal oxides such as MgO, CaO, BaO, SrO and the like also cause problems similar to but not same to those of the above-described alkali metal oxides, such as a decrease in the generated amount of ultraviolet rays, a change in dielectric constant, deterioration of electrical conductivity, and deterioration of refractories. Therefore, a total of alkali metal oxides and alkaline-earth metal oxides is desirably less than 0.1%, and more desirably 0.01% or less.

The glass component can contain $V_2O_5$, $Ag_2O$, $Co_2O_3$, $MoO_3$, $Nb_2O_5$, $Ta_2O_5$, $Ga_2O_3$, $Sb_2O_3$, $WO_3$, $P_2O_5$, $SnO_x$ (x=1 or 2), $Cs_2O$ and the like in 5% or less, preferably 3% or less as components other than those described above. But, addition of highly toxic components such as lead, thallium, cadmium, vanadium and the like is desirably avoided in view of environmental issues.

Glass having the above-described components is amorphous glass having a low glass transition point of 400° C. or less and good fluidity. The coefficient of thermal expansion of glass at 30-300° C. is $90 \times 10^{-7}/°$ C. or more and $110 \times 10^{-7}/°$ C. or less, and a high-expansion material satisfying the conditions can be sealed without blending a refractory ceramics filler.

Meanwhile, where various types of packages or display devices, which are made of a material not conforming to the coefficient of thermal expansion of glass, are sealed, a refractory ceramics filler can be mixed and used as a sealing composition to correct a difference in coefficient of thermal expansion from the sealed material. And, the refractory ceramics filler can also be used if a mechanical strength is insufficient.

When the refractory ceramics filler is mixed, its mixing ratio is preferably 1-40 volume % to 60-99 volume % of low melting glass powder. The reason of setting the mixing ratio as described above is that the effect cannot be obtained if the refractory ceramics filler is smaller than 1 volume % and becomes poor in fluidity if it is larger than 40 volume %.

As the refractory ceramics filler, it is desirable to use at least one element selected from the group consisting of zircon, cordierite, aluminium titanate, alumina, mullite, silica (rock crystal, α-quartz, quartz glass, cristobalite, tridymite, etc.), tin oxide ceramics, β-eucryptite, β-spodumene, zirconium phosphate ceramics and β-quartz solid solution. Especially, a filler mainly consisting of $Al_2O_3$ and $SiO_2$ has an effect to suppress crystallization when pre-baking as $Al_2O_3$ and $SiO_2$ partly elute into the glass when pre-baking.

But, if these components are eluted excessively, the glass viscosity is increased to disable sealing, so that these fillers are determined to have a specific surface area of 5 $m^2/g$ or less, preferably 3 $m^2/g$ or less. These values of the specific surface area were determined by measuring according to the gas adsorption BET method specified in JIS R 1626. A black pigment such as an Fe—Co—Cr complex oxide type or the like can also be used as a refractory pigment.

The vehicles used in the present invention are those prepared by dissolving e.g., methyl cellulose, ethyl cellulose, carboxymethyl cellulose, oxyethyl cellulose, benzyl cellulose, propyl cellulose, nitrocellulose or the like into a solvent such as terpineol, butyl carbitole acetate, ethyl carbitole acetate, or dissolving an acryl-based resin such as methyl(meta)acrylate, ethyl(meta)acrylate, butyl(meta)acrylate, 2-hydroxyethylmethacrylate or the like into a solvent such as methyl ethyl ketone, terpineol, butyl carbitole acetate, ethyl carbitole acetate or the like.

The viscosity of the sealing glass paste is advisably adjusted to meet a viscosity suitable for an apparatus for coating to a substrate and can be adjusted according to a ratio between the resin and the solvent and a ratio between the vehicle and the sealing composition.

To the sealing glass paste can be added known additives such as a defoaming agent, a dispersant and the like which are known in connection with the glass paste.

For manufacturing of the sealing glass paste, a known method using a rotary mixer provided with stirring fins, a roll mill, a ball mill or the like can be used.

BEST MODE FOR CARRYING OUT THE INVENTION

A low melting glass of the present invention contains substantially no lead component, contains 70-90% of $Bi_2O_3$, 1-20% of ZnO, 2-12% of $B_2O_3$, 0.1-5% of $Al_2O_3$, 0.1-5% of $CeO_2$, 0-5% of CuO, 0-0.2% of $Fe_2O_3$ in mass %, and satisfies a relation of $Al_2O_3/Bi_2O_3$=0.01-0.1 and (CuO+$Fe_2O_3$)/$Bi_2O_3$=0.01-0.05in molat ratio. Besides, a total amount of the alkali metal oxides such as $Li_2O$, $Na_2O$, $K_2O$ and the like is set to less than 0.1%.

A preferable low melting glass of the present invention contains substantially no lead component and the like, contains 70-90% of $Bi_2O_3$, 5-15% of ZnO, 2-8% of $B_2O_3$, 0.1-5% of $Al_2O_3$ 0.01-2% of $SiO_2$, 0.1-5% of $CeO_2$, 0.01-4.99% of CuO, 0.01-0.2% of $Fe_2O_3$ and 0.05-5% of CuO+$Fe_2O_3$ in mass %, and has a composition with a total amount of alkali metal oxides and alkaline-earth metal oxides in less than 0.1%.

And, the materials were mixed in the above-described composition ranges to prepare a batch material. The batch material was put in a platinum crucible and placed in a furnace which was adjusted to 1000-1200° C., and melted for 30-90 minutes. And, the melted glass was formed into a sheet shape by a water-cooled roller, pulverized by a ball mill, and passed through a 150-mesh sieve to obtain a low melting glass.

The obtained low melting glass in 60-99 volume % was mixed with 1-40 volume % of powder of at least one type of refractory ceramics filler selected from the group consisting of zircon, cordierite, aluminium titanate, alumina, mullite, silica, tin oxide ceramics, β-eucryptite, β-spodumene, zirconium phosphate ceramics and β-quartz solid solution to prepare a sealing composition. And, this sealing composition was prepared into a paste by use of an organic-based vehicle or the like which decomposes at a sealing temperature or less to make it easy to coat on a sealed material. And, the sealing composition may be previously formed to have a shape of an adhered portion.

EXAMPLES

Examples and Comparative Examples of the present invention will be described in detail with reference to Tables 1 through 4.

TABLE 1

| | | E1-1 | E1-2 | E1-3 | E1-4 | E1-5 | E1-6 | CE1-1 | CE1-2 | CE1-3 | CE1-4 | CE1-5 | CE1-6 |
|---|---|---|---|---|---|---|---|---|---|---|---|---|---|
| Glass component (mass %) | $Bi_2O_3$ | 80.6 | 81.5 | 83.3 | 83.9 | 82.4 | 85.2 | 82.6 | 82.3 | 82.1 | 80.1 | 83.2 | 83.2 |
| | $B_2O_3$ | 7.2 | 6.2 | 5.7 | 6.2 | 5.7 | 4.8 | 6.2 | 6.5 | 6.2 | 6.3 | 6.2 | 6.2 |
| | ZnO | 11.2 | 10.8 | 10.0 | 7.6 | 10.8 | 8.6 | 10.8 | 9.7 | 10.8 | 11.1 | 9.8 | 9.8 |
| | $CeO_2$ | 0.4 | 0.4 | 0.1 | 0.3 | 0.4 | 0.6 | 0.4 | 0.4 | 0.4 | 0.3 | 0.3 | 0.3 |
| | $Al_2O_3$ | 0.2 | 0.5 | 0.5 | 1.4 | 0.4 | 0.5 | | 0.05 | 0.1 | 1.9 | 0.2 | 0.2 |
| | $V_2O_5$ | | | 0.15 | | | | | | | 0.4 | | |
| | $Li_2O$ | | | | | 0.05 | | | 0.05 | | | 0.1 | |

TABLE 1-continued

| | | | E1-1 | E1-2 | E1-3 | E1-4 | E1-5 | E1-6 | CE1-1 | CE1-2 | CE1-3 | CE1-4 | CE1-5 | CE1-6 |
|---|---|---|---|---|---|---|---|---|---|---|---|---|---|---|
| | | $Na_2O$ | | | | 0.05 | | | | | | | | 0.1 |
| | | $Fe_2O_3$ | 0.1 | 0.2 | 0.2 | 0.1 | | 0.2 | | 0.5 | | 0.2 | 0.1 | 0.1 |
| | | CuO | 0.3 | 0.4 | 0.05 | 0.45 | 0.25 | 0.1 | | 0.5 | | 0.1 | 0.1 | 0.1 |
| Component | $Al_2O_3/Bi_2O_3$ | | 0.011 | 0.028 | 0.027 | 0.076 | 0.022 | 0.027 | 0.000 | 0.003 | 0.006 | 0.108 | 0.011 | 0.011 |
| ratio | $(Fe_2O_3 + CuO)/$ | | 0.025 | 0.036 | 0.011 | 0.035 | 0.018 | 0.014 | 0.000 | 0.053 | 0.000 | 0.015 | 0.011 | 0.011 |
| (mol/mol) | $Bi_2O_3$ | | | | | | | | | | | | | |
| *1 | Glass | | 72 | 70 | 73 | 71 | 74 | 72 | 71 | 71 | 71 | 71 | 71 | 71 |
| (vol. %) | Filler | Zircon | | | | 8 | 11 | | 3 | 3 | 3 | 3 | 3 | 3 |
| | | Cordierite | 26 | 22 | 27 | 14 | | 25 | 26 | 26 | 26 | 26 | 26 | 26 |
| | | Silica | | 5 | | | | | | | | | | |
| | | Ziconium phosphate | 2 | 3 | | 7 | 15 | 3 | | | | | | |
| Glass transition point (° C.) | | | 356 | 355 | 350 | 348 | 351 | 344 | 351 | 350 | 353 | 362 | 349 | 350 |
| Softening point under load (° C.) | | | 380 | 379 | 368 | 366 | 372 | 356 | 374 | 352 | 366 | 391 | 364 | 365 |
| Softening point (° C.) | | | 416 | 407 | 391 | 385 | 399 | 373 | 397 | 399 | 402 | 422 | 391 | 392 |
| Pre-baking temperature | | | 550 | 540 | 520 | 510 | 520 | 480 | 500 | 500 | 500 | 500 | 520 | 520 |
| Crystallization when pre-baking | | | None | None | None | None | None | None | Yes | Yes | Yes | None | None | None |
| Flow button diameter (mm) | | | 19 | 20 | 23 | 22 | 20 | 26 | 17 | 17 | 16 | 16 | 22 | 21 |
| Vehicle compo- nent ratio | Resin | Ethyl cellulose (*2: 75000) | 2 | 2 | 2 | | | | 2 | 2 | 2 | | | |
| | | Ethyl cellulose (*2: 55000) | 2 | 2 | 2 | | | | 2 | 2 | 2 | | | |
| | | Nitrocellulose | | | | 2.5 | 2.5 | 2.5 | | | | 2.5 | 2.5 | 2.5 |
| | Solvent | Isoamyl acetate | | | | 3 | 3 | 3 | | | | 3 | 3 | 3 |
| | | Terpineol | 30 | 30 | 30 | 4 | 4 | 4 | 30 | 30 | 30 | 4 | 4 | 4 |
| | | Butyl carbitole acetate | 66 | 66 | 66 | 90.5 | 90.5 | 90.5 | 66 | 66 | 66 | 90.5 | 90.5 | 90.5 |
| Paste Compo- nent ratio | | Sealing composition | 82 | 82 | 82 | 80 | 80 | 80 | 82 | 82 | 82 | 80 | 80 | 80 |
| | | Vehicle | 18 | 18 | 18 | 20 | 20 | 20 | 18 | 18 | 18 | 20 | 20 | 20 |
| Viscosity | | | 65 | 67 | 65 | 68 | 69 | 64 | 67 | 67 | 67 | 66 | 66 | |
| Sealing temperature (° C.) | | | 460 | 470 | 480 | 480 | 480 | 450 | *4 | *4 | *4 | 490 | 460 | 460 |
| Coefficient of thermal expansion ($\times 10^{-7}/°$ C.) | | | 72 | 70 | 74 | 74 | 76 | 73 | 72 | 72 | 72 | 72 | 72 | 72 |
| Platinum crucible condition | | | | | | No defect | | | | | | | *3 | |

*1 = Component ratio of sealing composition
*2 = molecular weight
*3 = slight cracks
*4 = not adhered
E1 = Example 1
CE1 = Comparative Example 1

Example 1-1

As shown in Table 1, materials were blended to have 80.6% of $Bi_2O_3$, 7.2% of $B_2O_3$, 11.2% of ZnO, 0.4% of $CeO_2$, 0.2% of $Al_2O_3$, 0.1% of $Fe_2O_3$ and 0.3% of CuO to prepare a batch material. The batch material was put in a platinum crucible, placed in a melting furnace adjusted to 1100° C., and melted for 50 minutes. And, the melted glass was formed into a sheet shape by a water-cooled roller, pulverized by a ball mill, and passed through a 150-mesh sieve to obtain a low melting glass.

$Al_2O_3/Bi_2O_3$ of the low melting glass had a molar ratio of 0.46/40.92 to 0.011, and $(Fe_2O_3+CuO)/Bi_2O_3$ had a molar ratio of (0.15+0.89)/40.92 to 0.025.

The sealing composition was prepared by adding 26 volume % of cordierite and 2 volume % of zirconium phosphate as a refractory ceramics fillers to the low melting glass in 72 volume %. The sealing composition was measured for a glass transition point, a softening point under load and a softening point by a differential thermal analyzer (DTA) to find that the glass transition point was 356° C., the softening point under load was 380° C., and the softening point was 416° C.

The sealing composition had a flow button diameter of 19 mm, a sealing temperature of 460° C. after the pre-baking temperature of 550° C. and a coefficient of thermal expansion of $72 \times 10^{-7}/°$ C. They were measured by the following methods.

Flow button diameter: It is a diameter indicating the fluidity of a composition when sealing and determined by forming a powder sample of the sealing composition (6.0 g) into a cylindrical form having a diameter of 12.7 mm under a pressure with a load of 50-100 kg/$cm^2$, and keeping at 480° C. for 10 minutes to flow the sealing composition. This flow button diameter is desirably 17 mm or more and 28 mm or less. If it is less than 17 mm, the glass composition does not get soft enough and does not adhere to a sealed material. If it is larger than 28 mm, the glass flows excessively, and foams are formed on the sealing surface, or the adhered surface deforms.

Coefficient of thermal expansion: The sealing composition was charged in an alumina vessel, baked at 500° C. for 10 minutes, cooled down, and polished into a cylindrical shape having a length of 15 mm and a diameter of 5 mm. The expanded amount of the cylinder was measured by a compressive load method (using Thermomechanical Analyzer 8310 of Rigaku Corporation) under a condition of a temperature rising speed of 10° C. /minute, and an average coefficient of thermal expansion at 30-300° C. was calculated.

The sealing paste was prepared by mixing the vehicle and the sealing composition as described below.

Vehicle: Prepared by stirring 2% of ethyl cellulose (average molecular weight of 75000) and 2% of ethyl cellulose (average molecular weight of 55000) as the resins, and 30% of terpineol and 66% of butyl carbitble acetate as the solvents while heating to 60° C. for two hours.

Paste: Sealing paste was obtained by adding the vehicle to the sealing composition in a mass ratio of 82 to 18, and mixing by a roll mill. The viscosity of the obtained paste was measured by a B-type viscometer (HDBVII+ of Brookfield Engineering Laboratories Inc.) to find that it was 65 Pa·s.

The sealing temperature was measured as follows. First, a sample substrate was prepared by coating the above-prepared paste in thickness of 400-500 μm and width of 3 mm on a glass substrate (Asahi Glass Co., Ltd.: PD-200). This sample substrate was pre-baked in an electric furnace which was set to a pre-baking temperature. Another glass substrate was placed on the sample substrate, and baking was performed with a load of 500 g/cm$^2$ applied to the sealing composition-coated area to find a temperature at which both the glass substrates could be adhered.

The erosion property of platinum was checked by putting the material in a platinum crucible, melting ten times, and observing glass-adhered portions of the platinum crucible through a microscope.

It is seen from the above results that the sealing composition of Example 1-1 can seal the glass substrates at 460° C. after the pre-baking without deposition of crystal in the glass even if pre-baked at 550° C. And, erosion of platinum was not observed because alkali metal components ($Li_2O$, $Na_2O$ and $K_2O$) were not contained in the glass.

Examples 1-2 through 1-6

Examples 1-2 through 1-6 were performed to prepare sealing compositions in the same manner as in Example 1-1.

The method of Example 1-1 was repeated to melt glass excepting that the materials were blended as shown in Table 1 to prepare a batch material. The melted glass was formed into a sheet shape by a water-cooled roller, pulverized by a ball mill, and passed through a 150-mesh sieve to obtain low melting glasses.

$Al_2O_3/Bi_2O_3$ of the above-described low melting glasses has a molar ratio of 0.022-0.076, and $(CuO+Fe_2O_3)/Bi_2O_3$ has a molar ratio of 0.011-0.036. When sealing compositions having the low melting glasses and the refractory ceramics filler mixed were baked at a pre-baking temperature of 480-540° C., deposition of crystal was not observed in any of the glasses. And, because the low melting glasses had a softening point under load of 356-379° C., even the sealing compositions, which were obtained by mixing with the refractory ceramics filler, could be flown sufficiently at 480° C. or below. It was found by actually measuring that the sealing compositions had a flow button diameter of 20-26 mm as shown in Table 1.

In Examples 1-2 and 1-3, the sealing compositions were undergone the same method as in Example 1-1, and in Examples 1-4 through 1-6, the sealing compositions and a vehicle, which was prepared by stirring 2.5% of nitrocellulose as the resin and 14% of terpineol, 90.5% of butyl carbitole acetate and 3% of isoamyl acetate as the solvents while heating at 80° C. for two hours, were added in a mass ratio of 80 to 20, mixed by a roll mill to obtain sealing pastes. Viscosities of the pastes measured by a B-type viscometer were in a range of 64-69 Pa·s.

The obtained pastes were evaluated for a sealing temperature to find that the substrates could be adhered at a temperature in a range of 450 to 480° C.

It was found by measuring by a thermomechanical analyzer (TMA) that the sealing compositions had a coefficient of thermal expansion of 70-76×10$^{-7}$/° C. They are very close to the coefficient of thermal expansion of the glass used for the PDP. Therefore, the obtained sealing compositions had no possibility of strain after the sealing.

In Examples 1-1 through 1-6, when the glass component did not contain alkali metal oxides ($Li_2O$, $Na_2O$ and $K_2O$) or contained them in 0.05%, no deterioration was observed on the platinum crucibles. But, the platinum crucible observed after the tenth time of melting in Example 1-5 was found that it had little erosion on its bottom.

Comparative Example 1-1

Comparative Example 1-1 is an example not containing $Al_2O_3$ and $Fe_2O_3+CuO$ which are required in the present invention. The obtained sealing composition crystallized at 500° C. and could not seal.

Comparative Example 1-2

Comparative Example 1-2 is an example having 0.1% or less of $Al_2O_3$ which is required in the present invention. The obtained sealing composition crystallized at 500° C. and could not seal.

Comparative Example 1-3

Comparative Example 1-3 is an example having 0.1% or more of $Al_2O_3$ which is required in the present invention but not containing $Fe_2O_3+CuO$. The obtained sealing composition crystallized at 500° C. and could not seal.

Comparative Example 1-4

Comparative Example 1-4 is an example of $Al_2O_3$ having a molar ratio of $Al_2O_3/Bi_2O_3>0.1$ which is required in the present invention. The obtained sealing composition did not crystallize at 500° C., but the viscosity of the low melting glass was increased, the flow button diameter at 480° C. was less than 17 mm indicating poor fluidity, and sealing could not be made.

Comparative Examples 1-5, 1-6

Comparative Example 1-5 is an example of $Li_2O$ and Comparative Example 1-6 is an example of $Na_2O$, each containing 0.1% of alkali metal oxides. The obtained sealing compositions did not crystallize by pre-baking at 520° C. and could seal at 460° C. But, the crucible had cracks in the bottom, and melting of the glass could not be continued at the sixth time of melting of the glass in Comparative Example 1-5 and at the eighth time of melting in Comparative Example 1-6.

TABLE 2

|  |  | E2-1 | E2-2 | E2-3 | E2-4 | E2-5 | E2-6 | E2-7 | E2-8 | E2-9 |
| --- | --- | --- | --- | --- | --- | --- | --- | --- | --- | --- |
| Glass component (mass %) | $Bi_2O_3$ | 82.46 | 85.00 | 82.10 | 82.55 | 81.14 | 81.85 | 81.59 | 81.43 | 81.01 |
|  | $B_2O_3$ | 5.68 | 4.85 | 5.76 | 6.60 | 6.20 | 5.82 | 5.89 | 5.90 | 6.20 |
|  | ZnO | 10.67 | 8.60 | 10.62 | 9.70 | 10.26 | 10.62 | 10.63 | 10.59 | 10.56 |
|  | $SiO_2$ | 0.15 | 0.25 | 0.20 | 0.25 | 1.00 | 0.35 | 0.50 | 0.68 | 0.95 |
|  | $CeO_2$ | 0.20 | 0.20 | 0.20 | 0.20 | 0.20 | 0.20 | 0.20 | 0.40 | 0.15 |
|  | $Al_2O_3$ | 0.64 | 0.90 | 0.82 | 0.50 | 0.50 | 0.91 | 0.99 | 0.77 | 0.83 |
|  | $Li_2O$ |  |  |  |  |  |  |  |  |  |
|  | $Na_2O$ |  |  |  |  |  |  |  |  |  |
|  | $K_2O$ |  |  |  |  |  |  |  |  |  |
|  | MgO |  |  |  |  |  |  |  |  |  |
|  | CaO |  |  |  |  |  |  |  |  |  |
|  | BaO |  |  |  |  |  |  |  |  |  |
|  | SrO |  |  |  |  |  |  |  |  |  |
|  | $P_2O_5$ |  |  |  |  |  |  |  |  |  |
|  | $SnO_2$ |  |  |  |  |  |  |  |  | 0.10 |
|  | $Fe_2O_3$ | 0.10 | 0.10 | 0.20 | 0.10 | 0.10 | 0.15 | 0.10 | 0.13 | 0.10 |
|  | CuO | 0.10 | 0.10 | 0.10 | 0.10 | 0.60 | 0.10 | 0.10 | 0.10 | 0.10 |
| Component ratio (mol/mol) | $Al_2O_3/Bi_2O_3$ | 0.035 | 0.048 | 0.046 | 0.028 | 0.028 | 0.051 | 0.055 | 0.043 | 0.047 |
|  | $(Fe_2O_3 + CuO)/Bi_2O_3$ | 0.011 | 0.010 | 0.014 | 0.011 | 0.047 | 0.013 | 0.011 | 0.012 | 0.011 |
| *1 (vol. %) | Glass | 77 | 78 | 75 | 67 | 75 | 74 | 72 | 73 | 80 |
|  | Filler Zircon |  |  |  |  | 3 |  |  | 5 |  |
|  | Cordierite | 23 | 22 | 22 | 22 | 20 | 24 | 10 | 17 | 19 |
|  | Silica |  |  |  | 1 |  |  | 15 | 3 | 1 |
|  | Alumina |  |  | 3 | 10 |  | 2 | 3 | 2 |  |
|  | Zirconium phosphate |  |  |  |  | 2 |  |  |  |  |
| Glass transition point (° C.) |  | 354 | 351 | 359 | 353 | 373 | 361 | 362 | 365 | 370 |
| Softening point under load (° C.) |  | 379 | 380 | 384 | 380 | 400 | 386 | 387 | 390 | 395 |
| Softening point (° C.) |  | 403 | 398 | 409 | 403 | 423 | 410 | 411 | 414 | 418 |
| Pre-baking temperature |  | 500 | 510 | 510 | 500 | 540 | 510 | 520 | 520 | 530 |
| Crystallization when pre-baking |  | None | None | None | None | None | None | None | None | None |
| Flow button diameter (mm) |  | 21 | 22 | 20 | 18 | 23 | 20 | 20 | 21 | 23 |
| Vehicle component ratio | Resin Ethyl cellulose | 3 | 3 | 3 | 3 | 3 |  |  |  |  |
|  | Nitrocellulose |  |  |  |  |  | 3 | 3 | 3 | 3 |
|  | Methyl methacrylate |  |  |  |  |  |  |  |  |  |
|  | Solvent Isoamyl acetate | 5 | 5 | 5 | 5 | 5 | 5 | 5 | 5 | 5 |
|  | Terpineol | 20 | 20 | 20 | 20 | 20 | 20 | 20 | 20 | 20 |
|  | Butyl carbitole acetate | 72 | 72 | 72 | 72 | 72 | 72 | 72 | 72 | 72 |
| Paste Component ratio | Sealing composition | 86 | 86 | 86 | 86 | 86 | 86 | 86 | 86 | 86 |
|  | Vehicle | 14 | 14 | 14 | 14 | 14 | 14 | 14 | 14 | 14 |
|  | Viscosity(Pa · s) | 55 | 55 | 56 | 54 | 67 | 58 | 60 | 62 | 67 |
| Sealing temperature (° C.) |  | 460 | 450 | 460 | 470 | 450 | 460 | 460 | 460 | 450 |
| Appearance of sealed surface |  | Good | Good | Good | Good | Good | Good | Good | Good | Good |
| Coefficient of thermal expansion ($\times 10^{-7}$/° C.) |  | 71 | 75 | 71 | 68 | 69 | 69 | 71 | 71 | 74 |
| Platinum crucible condition |  |  |  |  |  | No defect |  |  |  |  |

*1 = Component ratio of sealing composition
E2 = Example 2

TABLE 3

|  |  | E2-10 | E2-11 | E2-12 | E2-13 | E2-14 | E2-15 | E2-16 | E2-17 | E2-18 |
| --- | --- | --- | --- | --- | --- | --- | --- | --- | --- | --- |
| Glass component (mass %) | $Bi_2O_3$ | 81.92 | 80.10 | 79.60 | 79.85 | 80.60 | 82.53 | 82.59 | 82.21 | 80.88 |
|  | $B_2O_3$ | 5.89 | 6.50 | 6.50 | 6.50 | 6.50 | 5.60 | 5.59 | 5.72 | 6.22 |
|  | ZnO | 10.63 | 10.50 | 10.10 | 10.50 | 10.50 | 10.60 | 10.52 | 10.63 | 10.38 |
|  | $SiO_2$ | 0.50 | 1.50 | 1.50 | 1.20 | 0.90 | 0.11 | 0.07 | 0.17 | 0.76 |
|  | $CeO_2$ | 0.20 | 0.20 | 0.20 | 0.20 | 0.20 | 0.20 | 0.20 | 0.25 | 0.50 |
|  | $Al_2O_3$ | 0.66 | 1.00 | 1.50 | 1.50 | 1.00 | 0.63 | 0.75 | 0.75 | 0.59 |
|  | $Li_2O$ |  |  |  |  |  |  | 0.03 | 0.02 |  |
|  | $Na_2O$ |  |  |  |  |  | 0.04 |  |  |  |
|  | $K_2O$ |  |  |  |  |  |  |  | 0.02 |  |
|  | MgO |  |  |  |  |  |  |  |  | 0.03 |
|  | CaO |  |  |  |  |  |  |  |  | 0.01 |
|  | BaO |  |  |  |  |  | 0.05 |  |  |  |
|  | SrO |  |  |  |  |  |  | 0.02 |  |  |
|  | $P_2O_5$ |  |  |  | 0.05 | 0.10 |  |  |  |  |
|  | $SnO_2$ |  |  |  |  |  |  |  |  | 0.10 |
|  | $Fe_2O_3$ | 0.10 | 0.10 | 0.20 | 0.10 | 0.10 | 0.11 | 0.11 | 0.13 | 0.10 |
|  | CuO | 0.10 | 0.10 | 0.40 | 0.10 | 0.10 | 0.13 | 0.12 | 0.10 | 0.43 |

TABLE 3-continued

| | | | E2-10 | E2-11 | E2-12 | E2-13 | E2-14 | E2-15 | E2-16 | E2-17 | E2-18 |
|---|---|---|---|---|---|---|---|---|---|---|---|
| Component ratio (mol/mol) | | $Al_2O_3/Bi_2O_3$ | 0.037 | 0.057 | 0.086 | 0.086 | 0.057 | 0.035 | 0.042 | 0.042 | 0.033 |
| | | $(Fe_2O_3 + CuO)/Bi_2O_3$ | 0.011 | 0.011 | 0.037 | 0.011 | 0.011 | 0.013 | 0.012 | 0.012 | 0.035 |
| *1 (vol. %) | Glass | | 75 | 77 | 82 | 76 | 75 | 69 | 76 | 77 | 76 |
| | Filler | Zircon | 5 | 2 | | 2 | | | 4 | 2 | 5 |
| | | Cordierite | 14 | 15 | 15 | 20 | 23 | 19 | 17 | 17 | 14 |
| | | Silica | 3 | 3 | 3 | 1 | 1 | | 3 | 4 | 5 |
| | | Alumina | 3 | 2 | | 1 | 1 | 12 | | | |
| | | Ziconium phosphate | | 1 | | | | | | | |
| Glass transition point (° C.) | | | 360 | 379 | 382 | 378 | 371 | 354 | 356 | 356 | 369 |
| Softening point under load (° C.) | | | 385 | 405 | 409 | 405 | 397 | 378 | 381 | 381 | 395 |
| Softening point (° C.)550 | | | 408 | 427 | 431 | 428 | 421 | 402 | 405 | 406 | 418 |
| Pre-baking temperature | | | 510 | 550 | 550 | 550 | 530 | 500 | 500 | 500 | 530 |
| Crystallization when pre-baking | | | None | None | None | None | None | None | None | None | None |
| Flow button diameter (mm) | | | 19 | 20 | 21 | 17 | 19 | 19 | 24 | 21 | 20 |
| Vehicle component ratio | Resin | Ethyl cellulose | | | | | | 3 | 3 | 3 | |
| | | Nitrocellulose | 3 | | | | | | | | 3 |
| | | Methyl methacrylate | | 3 | 3 | 3 | 3 | | | | |
| | Solvent | Isoamyl acetate | 5 | | | | | 5 | 5 | 5 | 5 |
| | | Terpineol | 20 | 30 | 30 | 30 | 30 | 20 | 20 | 20 | 20 |
| | | Butyl carbitole acetate | 72 | 67 | 67 | 67 | 67 | 72 | 72 | 72 | 72 |
| Paste Component ratio | | Sealing composition | 86 | 86 | 86 | 86 | 86 | 86 | 86 | 86 | 86 |
| | | Vehicle | 14 | 14 | 14 | 14 | 14 | 14 | 14 | 14 | 14 |
| | Viscosity(Pa · s) | | 60 | 74 | 74 | 70 | 66 | 54 | 54 | 55 | 64 |
| Sealing temperature (° C.) | | | 470 | 460 | 460 | 480 | 470 | 440 | 440 | 460 | 470 |
| Appearance of sealed surface | | | Good | Good | Good | Good | Good | Good | Good | Good | Good |
| Coefficient of thermal expansion ($\times 10^{-7}/°$ C.) | | | 74 | 72 | 75 | 70 | 68 | 72 | 73 | 73 | 73 |
| Platinum crucible condition | | | | | No defect | | | | Slight cracks | | |

*1 = Component ratio of sealing composition
E2 = Example 2

Example 2-1

As shown in Table 2, the materials were blended to have 82.46% of $Bi_2O_3$, 5.68% of $B_2O_3$, 10.67% of ZnO, 0.15% of $SiO_2$, 0.20% of $CeO_2$, 0.64% of $Al_2O_3$, 0.10% of $Fe_2O_3$ and 0.10% of CuO so as to prepare a batch material. The batch material was put in a platinum crucible, which was placed in a melting furnace adjusted to 1100° C., and melting was performed for 50 minutes. And, the melted glass was formed into a sheet shape by a water-cooled roller, pulverized by a ball mill, and passed through a 150-mesh sieve to obtain a low melting glass.

$Al_2O_3/Bi_2O_3$ of the low melting glass was set to a molar ratio of 0.035, $(Fe_2O_3+CuO)/Bi_2O_3$ was set to a molar ratio of 0.011, and $B_2O_3/ZnO$ was set to a molar ratio of 0.62.

The sealing composition was prepared by adding 23 volume % of cordierite as a refractory ceramics filler to 77 volume % of the low melting glass. The cordierite had a specific surface area of 3 $m^2$/g or less. The sealing composition was measured for a glass transition point, a softening point under load and a softening point by a differential thermal analyzer (DTA) to find that the glass transition point was 354° C., the softening point under load was 379° C., and the softening point was 403° C.

This sealing composition had a flow button diameter of 21 mm, a sealing temperature of 460° C. after the pre-baking at 500° C., and a coefficient of thermal expansion of $71 \times 10^{-7}/°$ C. Their measuring methods are shown below.

Flow button diameter: It is a diameter indicating the fluidity of a composition when sealing and determined by forming a powder sample of the sealing composition (6.0 g) into a cylindrical form having a diameter of 12.7 mm under a pressure with a load of 50-100 kg/$cm^2$, and keeping at 480° C. for 10 minutes to flow the sealing composition. This flow button diameter is desirably 17 mm or more and 26 mm or less. If it is less than 17 mm, the glass composition does not get soft enough and does not adhere to a sealed material. If it is larger than 26 mm, the glass flows excessively, and foams are formed because of cavities after sealing, or the adhered surface deforms.

Coefficient of thermal expansion: The sealing composition was charged in an alumina vessel, baked at 490° C. for 10 minutes, cooled down, and polished into a cylindrical shape having a length of 15 mm and a diameter of 5 mm. The expanded amount of the cylinder was measured by a compressive load method (using Thermomechanical Analyzer 8310 of Rigaku Corporation) under a condition of a temperature rising speed of 10° C. /minute, and an average coefficient of thermal expansion at 30-300° C. was calculated.

The sealing paste was prepared by mixing the vehicle and the sealing composition as described below.

Vehicle: Prepared by stirring 3% of ethyl cellulose as the resin, 20% of terpineol, 72% of butyl carbitole acetate and 5% of isoamyl acetate as the solvents while heating to 60° C. for two hours.

Paste: Sealing paste was obtained by adding the vehicle to the sealing composition in a mass ratio of 86 to 14, and mixing by a roll mill. The viscosity of the obtained paste was measured by a B-type viscometer (HDBVII+ of Brookfield Engineering Laboratories Inc.) to find that it was 55 Pa·s.

The sealing temperature was measured as follows. First, a sample substrate was prepared by coating the above-prepared paste in thickness of 400-500 μm and width of 3 mm on a glass substrate (Asahi Glass Co., Ltd.: PD-200). This sample substrate was pre-baked in an electric furnace which was set to a pre-baking temperature. Another glass substrate was placed on the sample substrate, and baking was performed with a load of 500 g/cm² applied to the sealing composition-coated area to find a temperature at which both the glass substrates could be adhered with a space of 200 μm or less therebetween.

The erosion property of platinum was checked by putting the material in a platinum crucible, melting 20 times, and observing glass-adhered portions of the platinum crucible through a microscope at every five times of melting.

It is seen from the above results that the sealing composition of Example 2-1 can seal the glass substrates at 460° C. after the pre-baking without deposition of crystal in the glass even if pre-baked at 500° C. And, erosion of platinum was not observed because alkali metal components ($Li_2O$, $Na_2O$ and $K_2O$) and alkaline-earth metal components (MgO, CaO, BaO, SrO) were not contained in the glass.

Examples 2-2 through 2-18

Examples 2-2 through 2-18 were performed to prepare sealing compositions in the same manner as in Example 2-1.

The method of Example 2-1 was repeated to melt glass excepting that the materials were blended as shown in Tables 2 and 3 to prepare the batch material. The melted glass was formed into a sheet shape by a water-cooled roller, pulverized by a ball mill, and passed -through a 150-mesh sieve to obtain low melting glasses.

$Al_2O_3/Bi_2O_3$ of the above-described low melting glasses has a molar ratio of 0.028-0.086, $(CuO+Fe_2O_3)/Bi_2O_3$ has a molar ratio of 0.010-0.047, and $B_2O_3/ZnO$ has a molar ratio of 0.62-0.80. When sealing compositions having the low melting glasses and the refractory ceramics filler mixed were baked at a pre-baking temperature of 500-550° C., deposition of crystal was not observed in any of the glasses. And, because the low melting glasses had a softening point under load of 378-409° C., even the sealing compositions, which were obtained by mixing with the refractory ceramics filler, could be flown sufficiently at 480° C. or below. It was found by actually measuring that the sealing compositions had a flow button diameter of 17-24 mm as shown in Tables 2 and 3.

In Examples 2-2 through 2-5 and 2-15 through 2-17, the sealing compositions were undergone the same method as in Example 2-1, and in Examples 2-6 through 2-10 and 2-18, the sealing compositions and a vehicle, which was prepared by stirring 3% of nitrocellulose as the resin, and 20% of terpineol, 72% of butyl carbitole acetate and 5% of isoamyl acetate as the solvents while heating at 80° C. for two hours, and in Examples 2-11 through 2-14, the sealing compositions and a vehicle, which was prepared by stirring 3% of methyl methacrylate as the resin and 30% of terpineol and 67% of butyl carbitole acetate as the solvents while heating at 80° C. for two hours, were added in a mass ratio of 86 to 14 and mixed by a roll mill to obtain sealing pastes, respectively. Viscosities of the pastes measured by a B-type viscometer were in a range of 54-74 Pa·s.

The obtained pastes were evaluated for a sealing temperature to find that the substrates could be adhered at a temperature in a range of 440 to 480° C.

It was found by measuring by a thermomechanical analyzer (TMA) that the sealing compositions had a coefficient of thermal expansion of $68-75 \times 10^{-7}$/° C. They are very close to the coefficient of thermal expansion of the glass used for the PDP. Therefore, the obtained sealing compositions had no possibility of strain after the sealing.

In Examples 2-1 through 2-18, no deterioration was observed on the platinum crucible even after 15 times of melting. In Examples 2-1 through 2-14 not containing an alkali metal component or an alkaline-earth metal component, no deterioration or erosion was observed on the platinum crucible even after 20 times of melting.

The refractory ceramics fillers shown in Tables 2 and 3 are only those using quartz glass among the components contained in silica, but the same effects were also obtained by using rock crystal, α-quartz, cristobalite and tridymite. And, the specific surface areas of the used refractory ceramics fillers are not shown but were 5 m²/g or less.

TABLE 4

| | | CE2-1 | CE2-2 | CE2-3 | CE2-4 | CE2-5 | CE2-6 | CE2-7 | CE2-8 | CE2-9 | CE2-10 | CE2-11 |
|---|---|---|---|---|---|---|---|---|---|---|---|---|
| Glass component | $Bi_2O_3$ | 83.09 | 83.10 | 82.62 | 81.95 | 82.44 | 83.05 | 79.10 | 78.28 | 82.59 | 84.85 | 82.67 |
| (mass %) | $B_2O_3$ | 5.75 | 5.64 | 5.64 | 6.08 | 5.56 | 5.64 | 6.50 | 7.11 | 5.64 | 6.75 | 5.45 |
| | ZnO | 10.69 | 10.68 | 10.64 | 10.61 | 10.25 | 10.68 | 10.45 | 10.37 | 10.68 | 7.10 | 10.44 |
| | $SiO_2$ | 0.27 | 0.11 | 0.11 | 0.28 | 0.04 | 0.11 | 1.50 | 2.50 | | 0.15 | 0.07 |
| | $CeO_2$ | 0.15 | 0.20 | 0.25 | 0.20 | 0.18 | 0.20 | 0.20 | 0.20 | 0.21 | 0.35 | 0.20 |
| | $Al_2O_3$ | | | 0.61 | 0.77 | 0.60 | 0.05 | 2.00 | 1.34 | 0.61 | 0.40 | 0.57 |
| | $Li_2O$ | | | | | | | | | | | 0.17 |
| | $Na_2O$ | | | | | | 0.03 | | | | | |
| | $K_2O$ | | | | | | | | | | | |
| | MgO | | | 0.02 | | | | | | | | |
| | CaO | | | | | | | | 0.05 | | | 0.10 |
| | BaO | | | | | 0.05 | | | | | | 0.10 |
| | SrO | 0.05 | | | | | | | | | | |
| | $P_2O_5$ | | | | | | | | | | | |
| | $SnO_2$ | | | | | | | | | | | |
| | $Fe_2O_3$ | | 0.11 | | 0.11 | 0.20 | 0.11 | 0.10 | 0.10 | 0.11 | 0.15 | 0.13 |
| | CuO | | 0.16 | 0.11 | | 0.65 | 0.16 | 0.10 | 0.10 | 0.16 | 0.25 | 0.10 |
| Component ratio | $Al_2O_3/Bi_2O_3$ | 0.000 | 0.000 | 0.034 | 0.043 | 0.033 | 0.003 | 0.116 | 0.078 | 0.034 | 0.022 | 0.032 |
| (mol/mol) | $(Fe_2O_3 + CuO)/Bi_2O_3$ | 0.000 | 0.015 | 0.008 | 0.004 | 0.053 | 0.015 | 0.011 | 0.011 | 0.015 | 0.022 | 0.012 |
| *1 | Glass | 75 | 75 | 75 | 75 | 75 | 75 | 75 | 75 | 75 | 75 | 75 |
| (vol. %) | Filler Zircon | 5 | 5 | 5 | 5 | 5 | 5 | 5 | 5 | 5 | | 5 |
| | Cordierite | 14 | 14 | 14 | 14 | 14 | 14 | 14 | 14 | 14 | 22 | 14 |
| | Silica | 3 | 3 | 3 | 3 | 3 | 3 | 3 | 3 | 3 | | 3 |
| | Alumina | 3 | 3 | 3 | 3 | 3 | 3 | 3 | 3 | 3 | 3 | 3 |
| | Ziconium phosphate | | | | | | | | | | | |

TABLE 4-continued

|  | | | CE2-1 | CE2-2 | CE2-3 | CE2-4 | CE2-5 | CE2-6 | CE2-7 | CE2-8 | CE2-9 | CE2-10 | CE2-11 |
|---|---|---|---|---|---|---|---|---|---|---|---|---|---|
| Glass transition point (° C.) | | | 355 | 352 | 354 | 364 | 353 | 351 | 384 | 398 | 352 | 351 | 350 |
| Softening point under load (° C.) | | | 379 | 376 | 378 | 389 | 376 | 376 | 412 | 425 | 376 | 378 | 375 |
| Softening point (° C.) | | | 403 | 400 | 402 | 413 | 400 | 400 | 435 | 446 | 399 | 401 | 399 |
| Pre-baking temperature | | | 480 | 480 | 480 | 480 | 480 | 480 | 550 | 570 | 500 | 510 | 480 |
| Crystallization when pre-baking | | | Yes | Yes | Yes | Yes | Yes | Yes | None | None | None | Yes | Yes |
| Flow button diameter (mm) | | | 13 | 17 | 18 | 18 | 16 | 16 | 16 | 16 | 27 | 17 | 14 |
| Vehicle component ratio | Resin | Ethyl cellulose | | | | | | | | | | 3 | |
| | | Nitrocellulose | 3 | 3 | 3 | 3 | 3 | 3 | 3 | 3 | 3 | | 3 |
| | | Methyl methacrylate | | | | | | | | | | | |
| | Solvent | Isoamyl acetate | 5 | 5 | 5 | 5 | 5 | 5 | 5 | 5 | 5 | 5 | 5 |
| | | Terpineol | 20 | 20 | 20 | 20 | 20 | 20 | 20 | 20 | 20 | 20 | 20 |
| | | Butyl carbitole acetate | 72 | 72 | 72 | 72 | 72 | 72 | 72 | 72 | 72 | 72 | 72 |
| Paste Component ratio | | Sealing composition | 86 | 86 | 86 | 86 | 86 | 86 | 86 | 86 | 86 | 86 | 86 |
| | | Vehicle | 14 | 14 | 14 | 14 | 14 | 14 | 14 | 14 | 14 | 14 | 14 |
| | Viscosity(Pa · s) | | 56 | 54 | 54 | 55 | 53 | 54 | 74 | 88 | 53 | 56 | 54 |
| Sealing temperature (° C.) | | | 480 | 480 | 480 | 480 | 480 | 480 | 510 | 520 | 430 | 440 | 480 |
| Appearance of sealed surface | | | | *2 | | *3 | *2 | | Good | | Foams | *2 | |
| Coefficient of thermal expansion (×10$^{-7}$/° C.) | | | 69 | 69 | 69 | 69 | 70 | 69 | 67 | 66 | 70 | 71 | 70 |
| Platinum crucible condition | | | | No defect | | | Cracked | | *4 | | *5 | No defect | *5 |

*2 = unsealable due to crystallization
*3 = slight crystallization
*4 = slight cracks due to melting temperature increase
*5 = slight cracks
CE2 = Comparative Example

Comparative Example 2-1

Comparative Example 2-1 is an example not containing $Al_2O_3$, $Fe_2O_3$ and CuO. The obtained sealing composition crystallized when pre-baked at 480° C. and could not seal.

Comparative Example 2-2

Comparative Example 2-2 is an example not containing $Al_2O_3$. The obtained sealing composition crystallized when pre-baked at 480° C. and could not seal.

Comparative Example 2-3

Comparative Example 2-3 is an example not containing $Fe_2O_3$. The obtained sealing composition crystallized when pre-baked at 480° C. and could not seal.

Comparative Example 2-4

Comparative Example 2-4 is an example not containing CuO. The obtained sealing composition slightly crystallized at 480° C. and could not seal.

Comparative Example 2-5

Comparative Example 2-5 is an example that $(Fe_2O_3+CuO)/Bi_2O_3$ has a molar ratio of $(Fe_2O_3+CuO)/Bi_2O_3>0.05$. The obtained sealing composition crystallized when pre-baked at 480° C. and could not seal.

Comparative Example 2-6

Comparative Example 2-6 is an example that $Al_2O_3/Bi_2O_3$ has a molar ratio of $Al_2O_3/Bi_2O_3<0.01$. The obtained sealing composition crystallized when pre-baked at 480° C. and could not seal.

Comparative Example 2-7

Comparative Example 2-7 is an example that $Al_2O_3/Bi_2O_3$ has a molar ratio of $Al_2O_3/Bi_2O_3>0.1$. The obtained sealing composition did not crystallize even when pre-baked at 550° C., but the viscosity of the low melting glass increased, and the flow button diameter at 480° C. was less than 16 mm, indicating poor fluidity. Thus, it could not seal. It was necessary to raise the melting temperature to 1250° C. to melt the glass, and it was found by observing after the 15th time of melting that little erosion was on the bottom of the platinum crucible.

Comparative Example 2-8

Comparative Example 2-8 is an example that the added amount of $SiO_2$ is larger than 2%. The obtained sealing composition did not crystallize when pre-baked at 570° C., but the viscosity of the low melting glass was high, and the flow button diameter at 480° C. was less than 16 mm, indicating poor fluidity. Thus, it could not seal. And, it was necessary to raise the melting temperature to 1250° C. to melt the glass, and it was found by observing after the 15th time of melting that little erosion was on the bottom of the platinum crucible.

Comparative Example 2-9

Comparative Example 2-9 is an example not containing $SiO_2$. The obtained sealing composition did not crystallize when pre-baked at 500° C. and could seal at 430° C. But, it was not suitable as the sealing material because remaining foams in streaks, which seemed resulting from the recesses produced near the center of the sealed surface when pre-baking, were produced. And, it was found by observing after the 15th time of melting that little erosion was on the bottom of the platinum crucible.

Comparative Example 2-10

Comparative Example 2-10 is an example that $B_2O_3/ZnO$ has a molar ratio of 1 or more. In this Comparative Example, crystal had deposited in the glass obtained by melting, and a low melting glass could not be obtained.

Comparative Example 2-11

Comparative Example 2-11 is an example containing exceeding 0.1% of a total amount of alkaline-earth metal components (CaO and BaO). The obtained sealing composition crystallized when pre-baked at 480° C. and could not seal. And, it was found by observing after the 10th time of melting that little erosion was on the bottom of the platinum crucible, and cracks were formed in the bottom of the crucible at the 15th to 20th times of melting, and melting of the glass could not be continued.

Some of the sealing compositions of the present invention crystallize at a temperature of exceeding 550° C. and can be used as lead-free crystallization glass of a member sealable at a high temperature of exceeding 550° C.

What is claimed is:

1. A low melting glass, which contains substantially no lead and contains 70-90% of $Bi_2O_3$, 1-20% of ZnO, 2-12% of $B_2O_3$, 0.1-5% of $Al_2O_3$, 0.1-5% of $CeO_2$, 0-5% of CuO, 0-0.2% of $Fe_2O_3$ and 0.05-5% of $CuO+Fe_2O_3$ in mass %, wherein a total amount of alkali metal oxides is less than 0.1%.

2. The low melting glass according to claim 1, which satisfies a relation of $Al_2O_3/Bi_2O_3=0.01$-$0.1$ and $(CuO+Fe_2O_3)/Bi_2O_3=0.01$-$0.05$ in molar ratio.

3. The low melting glass according to claim 1, wherein the low melting glass does not crystallize by pre-baking and can seal at a temperature not higher than that for the pre-baking.

4. A sealing composition, comprising 60-99 volume % of powder of the low melting glass according to claim 1, and 1-40 volume % of powder of at least one type of refractory ceramics filler selected from the group consisting of zircon, cordierite, aluminium titanate, alumina, mullite, silica, tin oxide ceramics, β-eucryptite, β-spodumene, zirconium phosphate ceramics and β-quartz solid solution.

5. A sealing composition, comprising 60-99 volume % of powder of the low melting glass according to claim 2, and 1-40 volume % of powder of at least one type of refractory ceramics filler selected from the group consisting of zircon, cordierite, aluminium titanate, alumina, mullite, silica, tin oxide ceramics, β-eucryptite, β-spodumene, zirconium phosphate ceramics and β-quartz solid solution.

6. A sealing composition, comprising 60-99 volume % of powder of the low melting glass according to claim 3, and 1-40 volume % of powder of at least one type of refractory ceramics filler selected from the group consisting of zircon, cordierite, aluminium titanate, alumina, mullite, silica, tin oxide ceramics, β-eucryptite, β-spodumene, zirconium phosphate ceramics and β-quartz solid solution.

7. A sealing paste, which is obtained by mixing the sealing composition according to claim 4 with a vehicle.

8. A sealing paste, which is obtained by mixing the sealing composition according to claim 5 with a vehicle.

9. A sealing paste, which is obtained by mixing the sealing composition according to claim 6 with a vehicle.

10. A low melting glass, which contains substantially no components of lead, thallium, cadmium and vanadium, and contains 70-90% of $Bi_2O_3$, 5-15% of ZnO, 2-8% of $B_2O_3$, 0.1-5% of $Al_2O_3$, 0.01-2% of $SiO_2$, 0.1-5% of $CeO_2$, 0.01-4.99% of CuO, 0.01-0.2% of $Fe_2O_3$ and 0.05-5% of $CuO+Fe_2O_3$ in mass %, wherein a total amount of alkali metal oxides and alkaline-earth metal oxides is less than 0.1%.

11. The low melting glass according to claim 10, which satisfies a relation of $Al_2O_3/Bi_2O_3=0.01$-$0.1$ and $(CuO+Fe_2O_3)/Bi_2O_3=0.01$-$0.05$ in molar ratio.

12. The low melting glass according to claim 10, wherein the low melting glass does not crystallize by pre-baking and can seal at a temperature not higher than that for the pre-baking.

13. A sealing composition, comprising 60-99 volume % of powder of the low melting glass according to claim 10, and 1-40 volume % of powder of at least one type of refractory ceramics filler selected from the group consisting of zircon, cordierite, aluminium titanate, alumina, mullite, silica, tin oxide ceramics, β-eucryptite, β-spodumene, zirconium phosphate ceramics and β-quartz solid solution.

14. A sealing composition, comprising 60-99 volume % of powder of the low melting glass according to claim 11, and 1-40 volume % of powder of at least one type of refractory ceramics filler selected from the group consisting of zircon, cordierite, aluminium titanate, alumina, mullite, silica, tin oxide ceramics, β-eucryptite, β-spodumene, zirconium phosphate ceramics and β-quartz solid solution.

15. A sealing composition, comprising 60-99 volume % of powder of the low melting glass according to claim 12, and 1-40 volume % of powder of at least one type of refractory ceramics filler selected from the group consisting of zircon, cordierite, aluminium titanate, alumina, mullite, silica, tin oxide ceramics, β-eucryptite, β-spodumene, zirconium phosphate ceramics and β-quartz solid solution.

16. A sealing paste, which is obtained by mixing the sealing composition according to claim 13 with a vehicle.

17. A sealing paste, which is obtained by mixing the sealing composition according to claim 14 with a vehicle.

18. A sealing paste, which is obtained by mixing the sealing composition according to claim 15 with a vehicle.

* * * * *